May 31, 1927.
E. R. DURGIN
EYEGLASS AND SPECTACLE FRAME
Filed Aug. 16, 1924
1,630,258
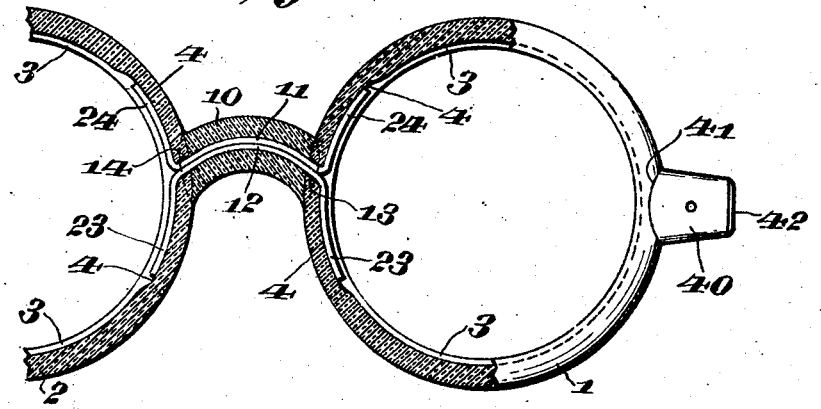
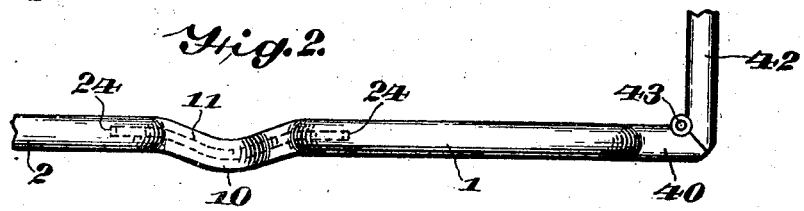
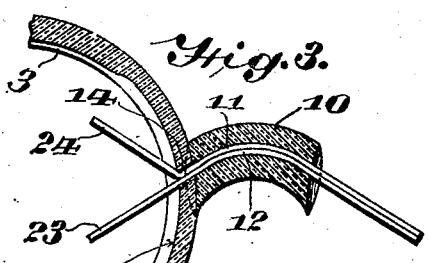
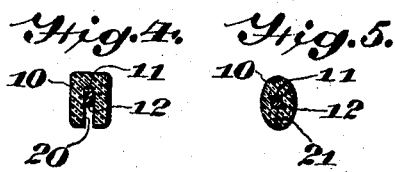
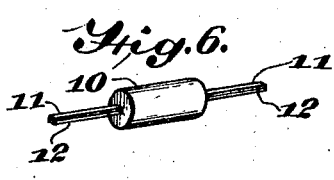
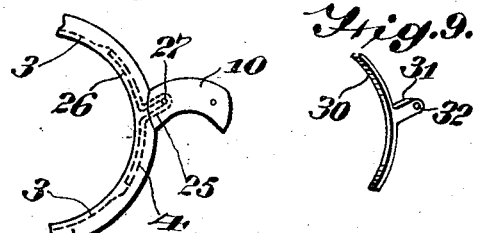
INVENTOR.
Edgar R. Durgin
BY
Cyrus N. Anderson
ATTORNEY.

Patented May 31, 1927.

1,630,258

UNITED STATES PATENT OFFICE.

EDGAR R. DURGIN, OF NEWARK, NEW JERSEY, ASSIGNOR, BY MESNE ASSIGNMENTS, TO CONTINENTAL OPTICAL CORPORATION, OF NEW YORK, N. Y., A CORPORATION OF DELAWARE.

EYEGLASS AND SPECTACLE FRAME.

Application filed August 16, 1924. Serial No. 732,402.

The invention relates to eye-glass and spectacle frames which are constructed of non-metal material such as zylonite or celluloid. More particularly and specifically the invention relates to reinforcing means employed in connection with the bridge and the connection between the same and the rims for holding the lenses of eye-glasses or spectacles.

One objection to eye-glass and spectacle frames constructed of zylonite or equivalent material has been the large percentage of breakage of the bridge or of the connection between the bridge and the rims. A further objection has been that in the use of eye-glasses or spectacles the bridge has gradually become distorted or displaced from its original shape and position with respect to the rims whereby the lenses are not held by the frames in proper position with respect to the eyes.

The general object of the present invention therefore is to provide means which not only strengthens the brides of zylonite frames but also strengthens the connection between the said bridges and rims and which also prevents permanent relative displacement between the bridge and the rims as a result of usage.

It is also an object of the invention to provide metallic means concealed within the bridge and having interlocking engagement with rims for the purpose hereinbefore indicated.

To these and other ends the invention comprehends the construction as hereinafter described in detail and as illustrated in the drawing, in which one convenient form of mechanical embodiment of the invention is depicted. However, it will be understood that changes in the details of construction may be made within the scope of the claims without departing from the principle of the invention.

In the drawing,—

Fig. 1 is a view showing a portion of eye-glass frame partly in section and partly in front elevation, embodying the invention;

Fig. 2 is a top plan view of the same;

Fig. 3 is a view of a portion of the frame comprising the invention taken in a plane parallel with the plane of the rims of the frame;

Fig. 4 is a transverse sectional view of a bar of zylonite or equivalent material having a deep groove formed therein within which the reinforcing metal wires or bars have been placed;

Fig. 5 is a similar view showing the shape of the bridge in cross section after it has been subjected to pressure to close the groove shown in Fig. 4;

Fig. 6 is a view in perspective showing a portion or section of zylonite rod with the metal wires or bars extending therethrough, which portion is adapted to be attached at its opposite ends to rims to form the bridge of an eye-glass or spectacle frame;

Fig. 7 is a transverse section through a rim near one end thereof.

Fig. 8 is a view in front elevation of a portion of eye-glass or spectacle frame showing a modified construction of the reinforcing means;

Fig. 9 is a view in perspective of a reinforcing metal member of modified construction; and Fig. 10 is a similar view showing still another modification of the reinforcing metal member.

Referring to the drawings, 1 and 2 designate the rims of an eye-glass frame consisting of zylonite or equivalent material. The inner peripheral edges of each of these rims is provided with a groove 3. Each of these grooves is provided with a deepened or depressed portion 4 at the inner edges of the rims, which deepened portion extend in opposite directions upon the opposite sides of the points of connection with the opposite ends of the bridge to the rims.

In the several forms of construction the bridge comprises a portion 10 of zylonite or equivalent material, the opposite ends of which are connected to the opposing inner edges of the rims 1 and 2 of the frame. The connection of the opposite ends of the portion 10 to the rims is effected by cementing or in any known preferred manner.

In the construction as disclosed in Figs. 1 to 7, inclusive, the bridge also comprises as reinforcing and strengthening means a couple of wires 11 and 12 which extend longitudinally through the bridge and through openings 13 and 14 in the rims 1 and 2.

In order to position the flexible wires or bars 11 and 12 and secure the same within and longitudinally of the member 10 of the bridge, a short section or portion of zylonite is provided with a deep groove or slot, as indicated at 20 in Fig. 4, within which the wires or bars are placed. After the said wires have been placed in position the portion or section is compressed to close the outer edge portion of the groove or slot and bring the same together, as indicated at 21. In pressing the same the surface contour or configuration of the portion 10 may be changed to the shape desired. Such shape should be one which will provide a surface which may rest comfortably upon the nose of a wearer of the frame.

The oppositely projecting ends of the metal wires or bars 11 and 12 are inserted through the openings 13 and 14 in the rims, after which the opposite ends of the portion 10 are secured by cementing or otherwise to the adjacent edges of the rims 1 and 2, as is clearly indicated in Figs. 1, 2 and 3 of the drawings. The opposite ends of the wires 11 and 12 are then bent away from each other, as indicated at 23 and 24, and are positioned within the deepened or depressed portions 4 of the grooves 3. The depth of the deepened portions of the groove is such that after the opposite end portions 23 and 24 of the wires or bars 11 and 12 are positioned therein the outer surfaces of the said bars are practically flush with the bottom of the groove 3, as is indicated in Fig. 1 of the drawing.

In the construction as illustrated in Fig. 8 of the drawing, the zylonite portion 10 is provided with holes in the opposite ends thereof into which looped or bent portions 25 of bars or wires 26 are extended. These looped portions are anchored within the said openings by means of pins 27 which extend through the loops 25 and are adapted to be engaged thereby. The opposite end portions of the bars or wires 26 extend in opposite directions upon the inner sides of the rims and are seated within the depressed portions 4 of the grooves 3.

In Fig. 9 I have shown a different form of reinforcing member, which comprises a bar-like member 30 having at its middle a projection 31 which is adapted to be inserted through openings through the rims 1 and 2 and into holes in the opposite ends of the bridge portion 10. The outer ends of the projections 31 are provided with openings 32 through which pins such as 27 are adapted to pass to anchor and hold the said projections within the said holes. The opposite end portions of the bar-like member 30 upon opposite sides of the projection 31 are adapted to be and are seated within the deepened portions 4 of the grooves 3, heretofore referred to.

In Fig. 10 I have shown the bar 30 as being provided with a projection 35 at about its middle point, which projection is provided with a number of spurs or saw teeth 36 upon the opposite side thereof. The outer edges of the said projection are pointed, as indicated at 37. These projections 35 are adapted to be inserted through openings in the rims 1 and 2 and to be driven into the opposite ends of the zylonite bridge portion 10. The spurs or saw teeth 36 interlock with the material of the said bridge portion so that the said member 30 is anchored in place with the opposite end portions thereof seated within the depressed or deepened portions 4 of the groove 3.

The rims 1 and 2 are provided at their outer edges with lugs or projections 40 of zylonite material, the inner ends of which are secured by cementing or otherwise at 41 to the said rims. The inner ends of the temple bars 42 are secured to the said lugs by pivots or hinges, as indicated at 43.

It will be seen that by my invention I have provided an eye-glass or spectacle frame of zylonite or equivalent material in which the bridge and the connections between the opposite ends of the bridge and the rims are provided with metal reinforcing means whereby the strength of the structure is substantially increased and whereby the serviceability of the frame is greatly enhanced.

By the term zylonite, employed in the specification and claims, I intend to include not only the material generally known as zylonite but the material known in the trade as celluloid and other equivalent non-metallic material.

Having thus described my invention, what I claim and desire to secure by Letters Patent is:

1. An eye-glass or spectacle frame of zylonite in which the bridge and the connections between the opposite ends of which and the rims are reinforced by means of a plurality of wires extending longitudinally within and through the said bridge and through the adjacent portions of the rims, the end portions of the wires upon the inner sides of said rims being bent in opposite directions and seated within grooves in the said rims.

2. An eye-glass or spectacle frame comprising rims of zylonite for holding the lenses and a bridge comprising a portion of zylonite, the opposite ends of which are secured to the adjacent opposing inner edges of the rims, and a couple of flexible metal wires extending longitudinally of and through the said zylonite portion of the bridge and through adjacent portions of the rims, the portions of the said wires within the said rims being bent in opposite directions and interlocked with the said rims.

3. An eye-glass or spectacle frame comprising zylonite rims having openings through the inner edge portions thereof and also having grooves upon the inner peripheral edges thereof, portions of said grooves upon opposite sides of said openings being deeper than the remaining portions thereof, and a bridge comprising a zylonite portion, the opposite ends of which are secured to the inner opposing edges of the said rims, and the said zylonite portion being provided with an opening extending longitudinally therethrough, the opposite ends of which register with the openings through the said rims, and metal wires extending through the opening through the said bridge and through the openings in the said rims, and the ends of said wires within the said rims extending in opposite directions from said openings and being located within the deeper portions of the said grooves.

In testimony that I claim the foregoing as my invention I have hereunto signed my name this 1st day of August, A. D. 1924.

EDGAR R. DURGIN.